Aug. 2, 1949.  L. R. BUCKENDALE  2,477,576
AXLE HOUSING
Filed Jan. 14, 1946
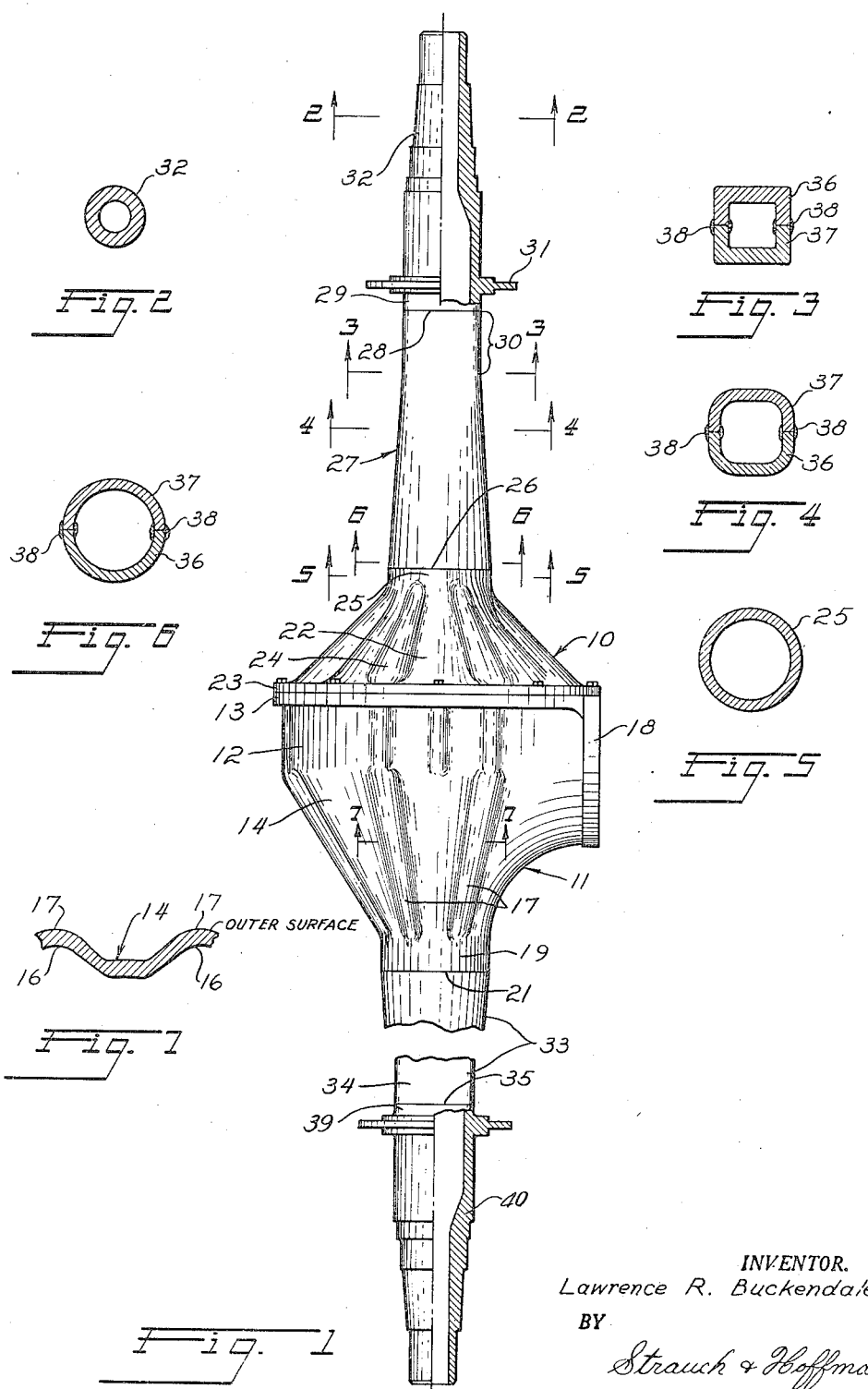
INVENTOR.
Lawrence R. Buckendale
BY
Strauch & Hoffman
ATTORNEYS Patented Aug. 2, 1949

2,477,576

UNITED STATES PATENT OFFICE 2,477,576

AXLE HOUSING

Lawrence R. Buckendale, Detroit, Mich., assignor to The Timken-Detroit Axle Company, Detroit, Mich., a corporation of Ohio Application January 14, 1946, Serial No. 641,151

2 Claims. (Cl. 74—607)

This invention relates to axle housings and particularly to automotive vehicle axle housings of the split type used to house the differential mechanism and axle shafts.

The invention contemplates, in its preferred embodiment, a readily assembled extremely strong axle housing construction wherein each separable center section part of the split type axle housing is longitudinally channeled and connected to a housing sleeve boss by a special transition section of circular cross-section where it is butt-welded to the similarly formed portion of the associated center section part and of rectangular cross-section where it is butt-welded to the housing sleeve boss.

It is therefore the primary object of this invention to provide an improved and strengthened split type axle housing construction.

Another important object of the invention is the provision of a fabricated split type axle housing having in each axle arm a transition portion of changing cross-section between a rectangular section at its outer end and an arcuate section at its inner end where it is secured to an arcuate boss on the center portion of the axle.

A further object of the invention is to provide a novel split type axle housing wherein each separable center section part is of special strengthened longitudinally channeled construction and terminates in a circular boss which is butt-welded to the similarly shaped end of a transition member made up of welded channel elements having a cross-section varying from said circular shape to a substantially rectangular outer end.

Other objects will become apparent as the description proceeds in connection with the appended claims and the accompanying drawings wherein:

Figure 1 is a top plan view, partly in section and partly broken away, of an axle housing illustrating a preferred embodiment of the invention;

Figures 2, 3, 4, 5 and 6 are sectional views respectively along the lines 2—2, 3—3, 4—4, 5—5 and 6—6 of Figure 1, looking in the direction of the arrows, for illustrating the changing cross-section of the axle housing; and Figure 7 is a fragmentary view in section illustrating the channeled transverse contour of a center section part.

As illustrated in Figure 1, the axle center section consists of mated, separable, enlarged housing parts 10 and 11 each circumferentially continuous and open at opposite ends. Part 11, which comprises the main closure for the differential gearing, is formed with an inner generally cylindrical portion 12 terminating in an annular flange 13, and portion 12 tapers into a generally conical reduced portion 14. While these aforesaid housing portions are variously described as cylindrical and conical, it will be understood that they are only of those general shapes since they are strengthened during manufacture by the formation of longitudinally channeled regions, as by casting.

Center section parts 10 and 11 are castings formed with special longitudinally channeled wall construction. The sloping wall 14 of part 11 is integrally cast or otherwise formed with a plurality of circumferentially equally spaced internally open channels 16 which appear externally as rounded formations 17. Channels 16 radiate longitudinally from an axle arm attachment boss 19 to the larger cylindrical portion 12 and are equally spaced except for the sector occupied by carrier attachment flange 18.

Similarly part 10 is formed with a plurality of integral longitudinal channels in sloping wall 22, these channels being equally spaced circumferentially and radiating from an outer axle arm attachment boss 25 to a larger attachment flange 23 which is bolted to flange 13 of part 11. The wall channels of part 10 appear as longitudinal formations 24 of rounded cross section extending along the external surface thereof, and the channels of both parts 10 and 11 are preferably in longitudinal alignment in the assembly for increased strength.

I have thus provided in my axle assembly a special center section which is longitudinally channeled for rigidity against both bending and torsional stresses. This special construction enables the saving of metal and use of a lighter weight center section without sacrifice of strength as compared to the previously used center sections which were heavy walled housings having thick solid external reenforcing ribs.

In each part 10 and 11 the housing wall preferably increases in thickness from the attachment end toward the axle arm attachment boss, and the channels increase in depth and decrease in width in the same direction.

This special channeled construction of the axle housing center section per se is described and claimed in detail in my co-pending application, Serial No. 641,152 filed on even date herewith and no further description thereof is deemed necessary to understand the present invention which is concerned in large measure with the novel combination of that center section with other elements of this split type axle housing assembly.

At its smaller end, conical portion 14 terminates in an arcuate, preferably cylindrical axle arm attachment boss 19 which terminates in an annular planar edge 21 at right angles to the axis of the axle housing. Center section part 10 also reduces to a cylindrical axle arm attachment boss 25 of the same shape and size as boss 19 and terminates in an annular transverse plane 26 at right angles to the housing axis. The identical cross-section of bosses 19 and 25 is illustrated in Figure 5.

Attached to cylindrical boss 25 at 26 is the inner end of a tubular transition member 27 which at one end has the same circular cross-section as boss 25 as illustrated in Figure 6 and is butt-welded to boss 25. The wall thickness and dimensions of transition member 27 and the cylindrical boss 25, where they are welded together at 26, are the same. At the intermediate plane 4—4, the changing cross-section of transition member 27 is substantially rectangular, with widely rounded corners, as illustrated in Figure 4. Transition member 27 terminates at 28 where it has a more rectangular cross-section than at plane 4—4, and has substantially square corners and the shape illustrated in Figure 3. The region 30 inward of end 28 and beyond plane 3—3 is of uniform unchanging rectangular cross-section of the same size and shape as the end of housing sleeve boss 29, to which it is butt-welded, for a sufficient distance to provide a suitable spring seat attachment portion.

At 28, transition member 27 is butt-welded to the co-extensive inner similarly shaped and sized rectangular cross-section end of a unitary member composed of a housing sleeve boss 29 (Figure 3 indicates its rectangular cross-section) integrally formed at its outer end with a circular wheel bearing spindle 32. An integral brake adapter spider 31 is formed on the unitary member which latter is preferably but not essentially of the type disclosed in United States Letters Patent to Wilber No. 2,204,287 issued June 11, 1940.

Transition member 27 is formed of two separately made upper and lower channeled elements 36 and 37 which are butt-welded together along their contacting horizontal edges on both sides as indicated at 38. Each element 36 and 37 is initially a uniform cross-section metal channel which is forged to the required changing cross-section. During the forging the vertical half walls of each channel element are transversely upset an increasing amount toward their outer rectangular spring seat portions, the excess material displaced by the upsetting thickening the side walls of the elements and providing sufficient material for forming square corners identical with those of Figure 3 with adequate wall thickness. These thickened corners are thus reenforced by the upset operation.

During the upsetting and forming operations the edges to be welded at 38 are maintained in a plane parallel to the axis of the housing, the elements being gradually and preferably uniformly shallowed as they approach their rectangular outer end.

Transition member 33 is identical with transition member 27, except for being slightly shorter, and is similarly formed. The inner circular end of transition member 33 is butt-welded to similarly shaped boss 19 at 21 and the outer rectangular spring seat portion 34 of transition member 33 is butt welded at 35 to the similarly shaped end of unitary housing sleeve boss 39 which is the same as boss 29. Wheel bearing spindle 40 is the same as spindle 32.

The novel split type axle housing assembly of this invention is of high strength in all its component parts which are individually made and assembled together in such manner as to produce overall strength and low cost in the assembly. There are no riveted or overlapping joints and the transition between each center section and the housing sleeve boss is such as to retain the housing strength and resistance to deflection.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A split type axle housing assembly comprising a pair of center section parts of the housing having enlarged ends rigidly secured together and terminating in reduced outer hollow axle arm attachment bosses of substantially cylindrical cross-section, said housing center section parts each comprising an inclined wall extending from its inner attached portion and merging directly into the associated boss, and each said wall being integrally formed with a plurality of circumferentially spaced internally open reenforcing channels that extend the length of said wall and appear as transversely rounded formations above the outer surface of said wall, an integral housing sleeve boss and wheel bearing spindle unit at each end of the housing assembly, each said unit being formed at its inner end with a region of substantially rectangular cross-section, and a tubular transition member between and in end abutment with each of said arcuate axle arm attachment bosses and the end of the adjacent housing sleeve boss, each said transition member being of such size and substantially cylindrical cross-section at its inner end as to abut co-extensively with its associated hollow boss on the center section and being formed at its outer end with a spring seat region of such rectangular cross-section as to abut substantially co-extensively with the similarly shaped inner end of the adjacent housing sleeve boss and being of intermediate gradually changing transverse cross-section between its ends.

2. An axle housing assembly comprising a hollow housing member having an inner large diameter end for attachment to a complementary housing member, a small diameter outer end defining a short longitudinally projecting substantially cylindrical boss, and a tapering body wall connecting said ends of the housing member, said wall being integrally formed with a plurality of circumferentially spaced internally open channels that extend the length of said wall and merge directly into said boss and appear externally as transversely rounded formations above the outer surface of said wall; a hollow tubular transition member having a corresponding cylindrical end portion butt-welded to the outer end of said cylindrical boss, an opposite end portion of substantially rectangular cross sectional form, and an intermediate portion of longitudinally progressively varying cross-sectional form extending between and integrally merged with said cylindrical and rectangular end portions of said transition member; and a housing sleeve boss formed at its inner end of substantially rectangular cross-sectional form butt-welded to said rectangular end portion of the transition member; said housing sleeve boss being provided at its outer end with a wheel bearing spindle.

LAWRENCE R. BUCKENDALE.

REFERENCES CITED

The following references are of record in the file of this patent:

UNITED STATES PATENTS

| Number | Name | Date |
|---|---|---|
| 1,209,134 | Dodge | Dec. 19, 1916 |
| 1,692,932 | Ford | Nov. 27, 1928 |
| 1,946,051 | Alden | Feb. 6, 1934 |
| 2,204,287 | Wilber | June 11, 1940 |
| 2,370,641 | Dewey | Mar. 6, 1945 |

FOREIGN PATENTS

| Number | Country | Date |
|---|---|---|
| 446,937 | France | Dec. 18, 1912 |
| 603,468 | France | Apr. 16, 1926 |